US 6,733,137 B2

(12) United States Patent
Tomiya

(10) Patent No.: US 6,733,137 B2
(45) Date of Patent: May 11, 2004

(54) DIGITAL MIRROR DEVICE PROJECTOR AND METHOD OF CORRECTING VIDEO SIGNAL BEING USED IN DIGITAL MIRROR DEVICE PROJECTOR

(75) Inventor: Shu Tomiya, Tokyo (JP)

(73) Assignee: NEC Viewtechnology Ltd., Tokyo (JP)

( * ) Notice: Subject to any disclaimer, the term of this patent is extended or adjusted under 35 U.S.C. 154(b) by 0 days.

(21) Appl. No.: 10/390,753

(22) Filed: Mar. 19, 2003

(65) Prior Publication Data

US 2003/0179347 A1 Sep. 25, 2003

(30) Foreign Application Priority Data

Mar. 22, 2002 (JP) .......................... 2002-080853

(51) Int. Cl.[7] .................. G03B 21/14; G03B 21/00; H04N 9/12; G02F 1/00
(52) U.S. Cl. .................... 353/84; 353/122; 348/771; 348/743
(58) Field of Search ................ 353/31–34, 37, 353/84, 85, 122, 98, 99; 349/7–10, 5; 348/770, 771, 742, 743; 345/31, 32, 108

(56) References Cited

U.S. PATENT DOCUMENTS

| 5,738,429 | A | * | 4/1998 | Tagawa et al. ............ 353/122 |
| 5,967,636 | A | * | 10/1999 | Stark et al. .................. 353/84 |
| 6,099,128 | A | * | 8/2000 | Jessl ........................... 353/51 |
| 6,419,365 | B1 | * | 7/2002 | Potekev et al. .............. 353/98 |
| 6,479,811 | B1 | * | 11/2002 | Kruschwitz et al. ..... 250/237 G |
| 6,520,648 | B2 | * | 2/2003 | Stark et al. .................. 353/85 |

FOREIGN PATENT DOCUMENTS

JP                10-78550 A            3/1998

\* cited by examiner

*Primary Examiner*—David Gray
*Assistant Examiner*—Andrew Sever
(74) *Attorney, Agent, or Firm*—Sughrue Mion, PLLC

(57) ABSTRACT

A projector device made up of a digital mirror device (DMD) having several hundreds of thousand of mirror elements is provided which is capable of reducing a difference in chromaticness (tint) caused by performance/characteristic variation between filters or between light sources. The DMD projector is made up of a photosensor being placed in such a position where light reflected from each of the mirror elements in an OFF state is incident, and a correcting unit to receive a video signal and a voltage obtained by a photosensor and to output a corrected video signal to a driving unit, wherein the driving unit controls an inclination of each of mirror elements of a DMD panel according to a corrected video signal and a revolution state of a color wheel and wherein the correcting unit corrects luminance signal for each color of video signals by calculating a relative intensity of light having passed through each filter making up the color wheel using the output of a photosensor occurring when each mirror element of the DMD panel is put in the OFF state.

14 Claims, 2 Drawing Sheets

DIGITAL MIRROR DEVICE PROJECTOR AND METHOD OF CORRECTING VIDEO SIGNAL BEING USED IN DIGITAL MIRROR DEVICE PROJECTOR

BACKGROUND OF THE INVENTION

1. Field of the Invention

The present invention relates to a projector device using a digital mirror device (hereinafter may be referred simply to as a "DMD") having a plurality of mirror elements and a method for correcting a video signal being used in the digital mirror device projector, and more particularly to the DMD projector that makes effective use of light being reflected while each of the mirror elements is turned OFF and a method for correcting the video signal being used in the digital mirror device projector.

The present application claims priority of Japanese Patent Application No. 2002-080853 filed on Mar. 22, 2002, which is hereby incorporated by reference.

2. Description of the Related Art

A DMD (Digital Mirror Device) projector is generally known which uses a DMD panel having several hundreds of thousand of mirror elements each being able to control an inclination for being mounted being placed on a semiconductor memory cell and which controls a reflection state by exerting control on the inclination of each of the mirror elements to form an image, which is disclosed in, for example, Japanese Patent Application Laid-open No. Hei 10-78550.

In the disclosed DMD projector, light emitted from a light source is configured to be condensed as a spot on a color wheel, being made up of a plurality of kinds of color filters adapted to selectively let any one of red, green, and blue color light pass and light having passed through any one of the color filters is applied, in a form of a parallel luminous flux, on the DMD panel and image light being light reflected off the DMD panel is projected through a zoom projection lens onto a screen.

However, the conventional DMD projector has problems. That is, in the above-described conventional DMD projector, light which passes through the color filters making up the color wheel and is reflected off a surface of the DMD panel towards the screen is used as image light. As a result, a wavelength component of each color light serving a source of image light is made different depending on variations in performance of the color filters making up the color wheel. Moreover, even when performance of the color filter is uniform between different filters, if light itself emitted from the light source has variations in wavelength or in intensity, the wavelength component of each color light is also made different and, even if image light is made up of a same video signal, it is difficult to calibrate image light so as to have same chromaticness (tint) among different devices.

SUMMARY OF THE INVENTION

In view of the above, it is an object of the present invention to provide a DMD projector using a DMD (Digital Mirror Device) panel which is capable of individually measuring intensity of each light of color being reflected while a mirror element is turned OFF and of correcting a video signal based on a result of the measurement, thus enabling each projector to provide an image having the same chromaticness (tint).

It is another object of the present invention to provide a method for correcting a video signal being used in the DMD projector.

According to a first aspect of the present invention, there is provided a digital mirror device projector including:

a light source;

a color wheel configured by combining a plurality of kinds of color filters for making image light of a plurality of colors;

a digital mirror device panel having a plurality of mirror elements each being controlled so as to be put in a first inclination state and in a second inclination state and reflecting light fed from the light source and passed through any one of the color filters making up the color wheel while being put in the first inclination state, as the image light, in a first direction and reflecting light fed from the light source and passed through any one of the color filters making up the color wheel while being put in the second inclination state in a second direction being different from the first direction;

a driving unit to control so as to put each of the mirror elements in the digital mirror device panel in the first inclination state or the second inclination state according to a corresponding video signal and a revolution state of the color wheel;

a photoelectric conversion device being placed as a photosensor in such a position where light reflected from at least one of the mirror elements is incident when the at least one of the mirror elements is in the second inclination state and, whereby the photoelectric conversion device receives the reflected light and converts the received light to a voltage;

a correcting unit to receive a video signal and the voltage obtained by the photoelectric conversion device, to correct the video signal, based on the received voltage and to output the corrected video signal to the driving unit.

In the foregoing first aspect, a preferable mode is one wherein the color wheel is configured by combining a red color filter, a green color and a blue color filter for making image light of the plurality of colors.

Also, a preferable mode is one wherein the driving unit controls so as to put the at least one of the mirror elements in the digital mirror device panel in the first inclination state or the second inclination state according to the corrected video signal and a revolution state of the color wheel.

Also, a preferable mode is one wherein the correcting unit calculates a relative intensity of light of color having passed through each of the color filters making up the color wheel, based on the voltage output from the photoelectric conversion device occurring when the at least one of the mirror elements of the digital mirror device panel is put in the second state, determines a weighted value to the light of color having passed through each of the color filters so that the relative intensity of the light of color is matched to a predetermined reference value, corrects a luminance signal for each color of a video signal using the weighted value and outputs the corrected luminance signal to the driving unit.

According to a second aspect of the present invention, there is provided a digital mirror device projector including:

a light source;

a color wheel configured by combining a plurality of kinds of color filters for making image light of a plurality of colors;

a digital mirror device panel having a plurality of mirror elements each being controlled so as to be put in a first inclination state and in a second inclination state and reflecting light fed from the light source and passed through any one of the color filters making up the color wheel while being put in the first inclination state, as the image light, in a first direction and reflecting light fed from the light source and passed through any one of the color filters making up the color wheel while being put in the second inclination state in a second direction being different from the first direction;

a driving unit to control so as to put each of the mirror elements in the digital mirror device panel in the first inclination state or the second inclination state according to a corresponding video signal and a revolution state of the color wheel;

a photoelectric conversion device being placed as a photosensor in such a position where light reflected from each of the mirror elements is incident when each of the mirror elements is in the second inclination state and, whereby the photoelectric conversion device receives the reflected light and converts the received light to a voltage;

a correcting unit to receive a video signal and the voltage obtained by the photoelectric conversion device, to correct the video signal, based on the received voltage and to output the corrected video signal to the driving unit.

According to a third aspect of the present invention, there is provided a method for correcting a video signal to be used in a digital mirror device projector made up of a light source, a color wheel configured by combining a plurality of kinds of color filters for making image light of a plurality of colors, a digital mirror device panel having a plurality of mirror elements each being controlled so as to be put in a first inclination state and in a second inclination state and reflecting light fed from the light source and passed through any one of the color filters making up the color wheel while being put in the first inclination state, as the image light, in a first direction and reflecting light fed from the light source and passed through any one of the color filters making up the color wheel while being put in the second inclination state in a second direction being different from the first direction, and a driving unit to control so as to put each of the mirror elements in the digital mirror device panel in the first inclination state or the second inclination state, the method including:

a step of placing a photoelectric conversion device as a photo-sensor in such a position where light reflected from at least one of the mirror elements is incident when the at least one of the mirror elements is in the second inclination state and, whereby the photoelectric conversion device receives the reflected light and converts the received light to a voltage;

a step of having a correcting unit receive a video signal and the voltage obtained by the photoelectric conversion device, correct the video signal, based on the received voltage and output the corrected video signal to the driving unit; and a step of having the driving unit control so as to put the at least one of the mirror elements in the digital mirror device panel in the first inclination state or the second inclination state according to the corrected video signal and a revolution state of the color wheel.

In the foregoing second aspect, a preferable mode is one wherein the color wheel is configured by combining a red color filter, a green color and a blue color filter for making image light of the plurality of colors.

Also, a preferable mode is one wherein the correcting unit calculates a relative intensity of light of color having passed through each of the color filters making up the color wheel, based on the output voltage from the photoelectric conversion device occurring when the at least one of the mirror elements of the digital mirror device panel is put in the second state, determines a weighted value to the light of color having passed through each of the color filters so that the relative intensity of the light of color is matched to a predetermined reference value, corrects a luminance signal for each color of a video signal using the weighted value and outputs the corrected luminance signal to the driving unit.

According to a fourth aspect of the present invention, there is provided a method for correcting a video signal to be used in a digital mirror device projector made up of a light source, a color wheel configured by combining a plurality of kinds of color filters for making image light of a plurality of colors, a digital mirror device panel having a plurality of mirror elements each being controlled so as to be put in a first inclination state and in a second inclination state and reflecting light fed from the light source and passed through any one of the color filters making up the color wheel while being put in the first inclination state, as the image light, in a first direction and reflecting light fed from the light source and passed through any one of the color filters making up the color wheel while being put in the second inclination state in a second direction being different from the first direction, and a driving unit to control so as to put each of the mirror elements in the digital mirror device panel in the first inclination state or the second inclination state, the method including:

a step of placing a photoelectric conversion device as a photo-sensor in such a position where light reflected from each of the mirror elements is incident when each of the mirror elements is in the second inclination state and, whereby the photoelectric conversion device receives the reflected light and converts the received light to a voltage;

a step of having a correcting unit receive a video signal and the voltage obtained by the photoelectric conversion device, correct the video signal, based on the received voltage and output the corrected video signal to the driving unit; and a step of having the driving unit control so as to put each of the mirror elements in the digital mirror device panel in the first inclination state or the second inclination state according to the corrected video signal and a revolution state of the color wheel.

By configuring the projector using the DMD panel as above, light having passed through the color wheel is incident on the DMD panel. An inclination state of each of the mirror elements on the DMD panel is controlled according to a video signal. An angle at which light is reflected is changed according to an ON or OFF state, where light reflected in the ON state travels toward a projection lens and light reflected in the OFF state is input to the photoelectric conversion device and is converted to an electrical signal representing intensity of light to be output from the photoelectric conversion device.

At this point, as a specified pattern for projection, for example, by projecting an image with 100% of red light projected on the screen and 0% applied to the photoelectric conversion device and with 100% of green light projected on the screen and 0% applied to the photoelectric conversion device and with 0% of blue light projected on the screen and 100% applied to the photoelectric conversion device, relative intensity of the blue light can be measured. By using the same method as above, intensity of red or green light can be measured sequentially. Thus, same chromaticness can be provided on an image to be projected on the screen by controlling the DMD panel through the panel driving unit after having made correction on each level of video signals using data on the intensity of red, green, and blue light as correction data in the correcting unit.

With the above configurations, since brightness of red, green, and blue color light for an image can be easily matched, it is possible that chromaticness is provided at a same level. No correction of the video signal by individually using an optical device with its light source being replaced is required.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
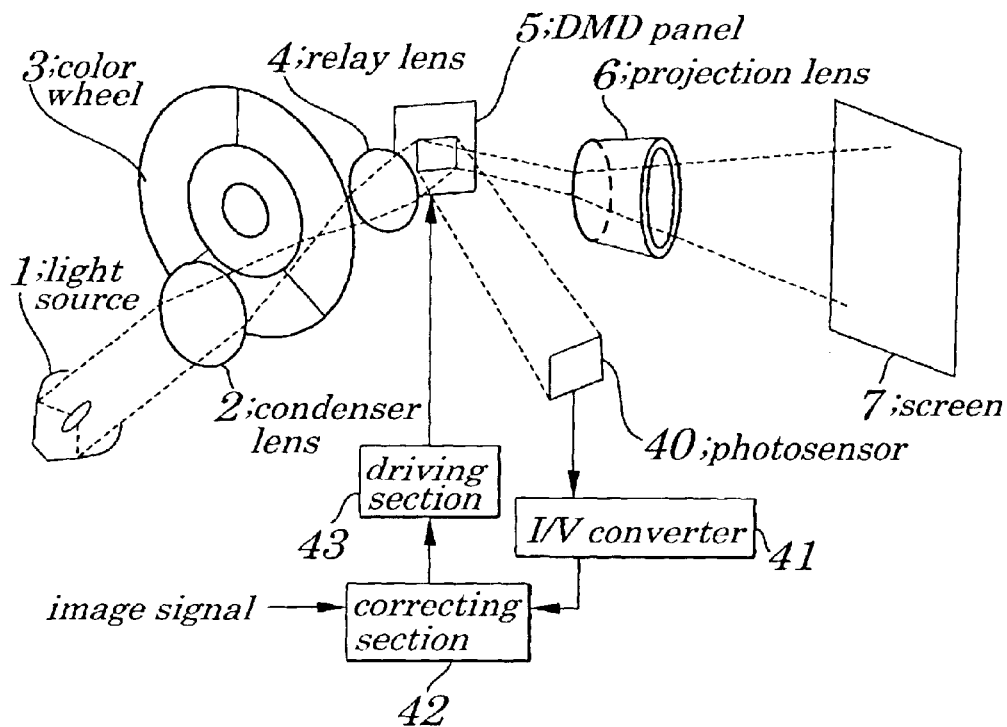
FIG. 1 is a diagram illustrating main components of a single-chip type of projector using a DMD (Digital Mirror Device) panel according to an embodiment of the present invention.

FIG. 1 is a diagram illustrating main components of a single-chip type of projector using a DMD (Digital Mirror Device) panel according to an embodiment of the present invention.

The DMD projector of the embodiment, as shown in FIG. 1, includes a light source 1, a condenser lens 2, a color wheel 3, a relay lens 4, a DMD panel 5, a projection lens 6, a screen 7, a photosensor (photoelectric conversion device) 40, an I/V (current to voltage) converter 41, a correcting section 42, and a driving section 43.

In the embodiment, operations of the DMD panel 5 made up of a plurality of mirror elements (not shown) are controlled by the driving section 43. The driving section 43 produces image light to be projected onto the screen 7 by exerting control on a corrected video signal to be fed from the correcting section 42 and on an inclination state of each of the mirror elements (not shown) making up the DMD panel 5 according to a revolution state of the color wheel 3. Correction of the video signal by the correcting section 42 will be described later.

The light emitted from the light source 1 is condensed by the condenser lens 2 and then is incident on the color wheel 3 so that light is brought into focus on the color wheel 3. An aim of the condensation and application of the light emitted from the light source 1 is to reduce time required for switching colors in the color wheel 3 by reducing a spot diameter of luminous flux of the light. Therefore, as described above, the color wheel 3 is so positioned that the light emitted from the light source 1 is condensed by the condenser lens 2 and the light is brought into focus thereon.

Figure 2:
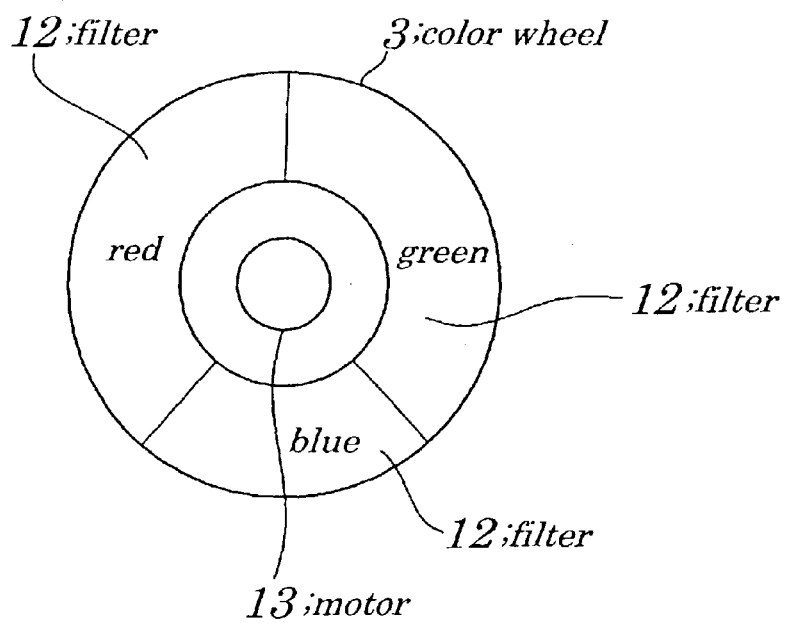
FIG. 2 is a front view of a color wheel employed in the embodiment of the present invention.

FIG. 2 is a front view of the color wheel 3 employed in the embodiment of the present invention.

The color wheel 3, as shown in FIG. 1 and FIG. 2, is made up of a disc having a plurality of kinds of color filters 12, so as to perform filtering on, for example, red, blue, green colors, and a like. The color wheel 3 is rotated at high speed by a motor 13 placed on an axis at its center. Since the light emitted from the light source 1 is condensed by the condenser lens 2 and the condensed light is applied to the color wheel 3, the rotation of the color wheel 3 causes the applied light to be filtered in order of the red, blue, and green colors and the filtered light is output to the relay lens 4.

The light having undergone filtering in such a manner that the light has any one of the red, blue, and green colors by the color wheel 3 travels, while being expanded as shown in FIG. 1, toward the DMD panel 5 and its luminous flux is calibrated by the relay lens 4 so that the light is effectively applied to the DMD panel 5. The light applied to the DMD panel 5 is incident on each of the mirror elements (not shown) making up the DMD panel 5. The above driving section 43 outputs a gray level signal used to control an inclination of each of the mirror elements (not shown) to the DMD panel 5 according to a gray level of each of the red, blue, and green colors represented by a video signal and uses light being reflected off each of the mirror elements (not shown) toward the projection lens 6 as the image light to be projected on the screen 7.

Figure 3:
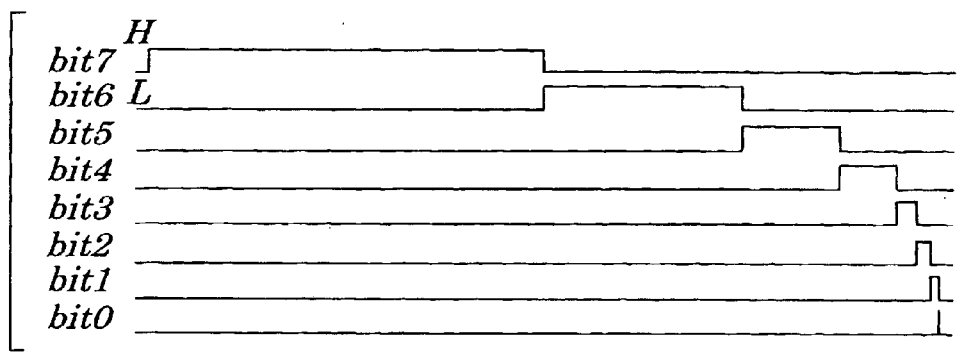
FIG. 3 is a diagram showing a waveform of a driving pulse to control a state of inclination of a mirror element employed in the embodiment of the present invention.

Here, a method of having light reflected off each of the mirror elements (not shown) of the DMD pane 15 express a gray level is described by referring to FIG. 3. FIG. 3 is a diagram showing a waveform of a driving pulse to control a state of inclination of each of the mirror elements (not shown) employed in the embodiment. In FIG. 3, a horizontal direction shows a lapse of time.

Let it be assumed that, as shown in FIG. 3, a gray level signal is made up of, for example, 8 bits each providing a waveform having a different period during which a signal is in a high (H) state in a predetermined unit time. In the example shown in FIG. 3, a highest bit "bit 7" provides a longest period during which a signal is in a high (H) state and a lowest order bit "bit 0" provides a shortest period during which a signal is in a high (H) state. The period during which a signal is in a high (H) state becomes shorter as the "bit 7" is changed sequentially to the "bit 0". When a period during which a signal is in a high (H) state for each of the "bit 7" to "bit 0" is totally summed, the signal becomes high (H) during all the period given in the predetermined time.

When a signal to select each bit is "1", a corresponding waveform prepared for each bit is output. The mirror elements (not shown) are inclined only while the waveform is in a high (H) state and the mirror elements (not shown) let incident light be reflected in a direction of the projection lens 6. When a waveform corresponding to each bit is in a low (L) state, the mirror elements (not shown) reflect incident light toward the photosensor 40. A gray level of an image is determined by selection of each bit.

Each image light is obtained, as reflection light, by performing the above operations on all mirror elements (not shown) of the DMD panel 5 and when any one of the red, blue, and green colors is applied, and thus the obtained image light is projected at a single picture element on the screen 7. Since revolution of the color wheel 3 is sufficiently fast, previous light stays as an afterimage detected by human eyes and almost no case occurs in which a color looks to have been decomposed.

Next, characteristic configurations of the embodiment are described.

As described above, an image light to be projected on the screen 7 is the image light reflected off the DMD panel 5 according to shades of gray in a projected image. In the embodiment, by using light not used as image light and not projected on the screen 7, an amount of light from the light source 1 is controlled. In the embodiment, light being incident through the relay lens 4, but not being projected on the screen 7 is input to the photosensor 40. The photosensor 40 outputs a current corresponding to intensity of the incident light and this current is converted to a voltage by the I/V converter 41 and then is output to the correcting section 42. The correcting section 42 receives a video signal in addition to a voltage output from the I/V converter 41 and makes correction on a video signal being fed from an external of the projector according to the embodiment and feeds corrected signals to the driving section 43.

The method for the correction of the video signal to be made by the correcting section 42 is described. First, each of the mirror elements (not shown) of the DMD panel 5 is put in a specified state, that is, an OFF state in which the reflected light is input to the photoelectric conversion device and, at this point, relative intensity of the each of red, green, and blue light having passed through the corresponding color filter 12 is calculated from a voltage output from the I/V converter 41 occurring when each of color light has passed through the corresponding color filter 12. Next, a weighted value for light having passed through each of the color filter 12 is determined so that the relative intensity is matched to a predetermined reference value and a luminance signal for each color represented by the video signal is corrected using the weighted value and the corrected video signal is output to the driving section 43. By operating the DMD panel so as to correspond to a level of a signal in the driving section 43, it is possible to represent same chromaticness (tint) all the time.

When the correction is made by the correcting section 42, the calculation of relative intensity of each of the red, green, and blue light having passed through the corresponding color filter 12 is performed at an initial time of using the projector of the embodiment and thereafter a video signal is corrected based on the calculated relative intensity of each of the red, green, and blue light having passed through the corresponding color filter 12.

Figure 4A:
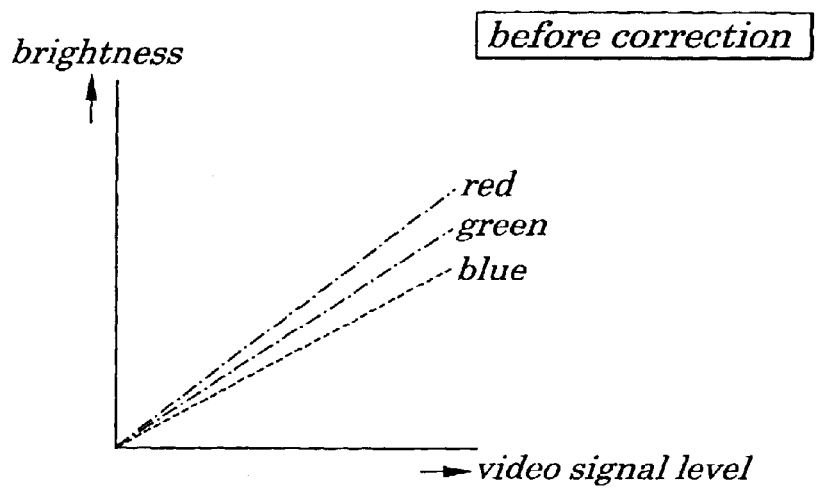
FIG. 4A is a diagram illustrating a relationship between brightness and video signal level of each of red; green, and blue colors obtained before correction
Figure 4B:
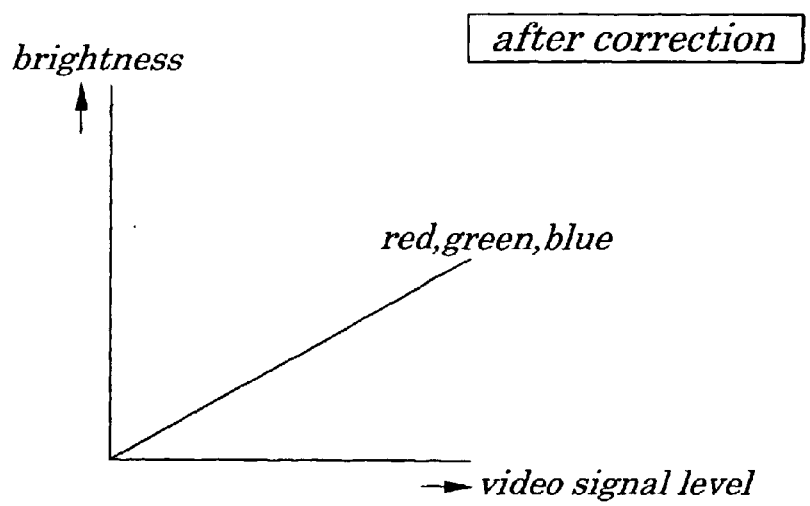
FIG. 4B is a diagram illustrating a relationship between brightness and video signal level after correction is made according to the embodiment of the present invention.

Here, effects of the correction on the video signals will be described by referring to FIGS. 4A and 4B. FIG. 4A is a diagram illustrating a relationship between brightness and a video signal level of each of the red, green, and blue colors obtained before the correction described above and FIG. 4B is a diagram illustrating brightness to the video signal level of each of the red, green, and blue colors after having made correction according to the embodiment of the present invention. Lines showing each characteristic in FIGS. 4A and 4B are provided for purpose of illustration and effects are not limited to those shown in the illustration. As shown in FIG. 4A, before the correction, the red color light, green color light, and blue color light are different from each other in brightness at an arbitrary level of the video signal. However, according to the embodiment of the present invention, as shown in FIG. 4B, after the correction, a relative difference in brightness between the red color light, green color light, and blue color light is corrected by the correcting section 42 so that the red color light, green color light, and blue color light are same in brightness at an arbitrary level of the video signal.

It is apparent that the present invention is not limited to the above embodiments but may be changed and modified without departing from the scope and spirit of the invention.

For example, a photo-sensor may be placed in such a position where light reflected from at least one of the mirror elements is incident when the at least one of the mirror elements is in the second inclination state and, whereby the photo-sensor receives the reflected light and converts the received light to a voltage. at least one of the mirror elements may be used so as to represent another mirror element or a specified group of the mirror elements.

What is claimed is:

1. A digital mirror device projector comprising:
   a light source;
   a color wheel configured by combining a plurality of kinds of color filters for making image light of a plurality of colors;
   a digital mirror device panel having a plurality of mirror elements each being controlled so as to be put in a first inclination state and in a second inclination state and reflecting light fed from said light source and passed through any one of said color filters making up said color wheel while being put in said first inclination state, as said image light, in a first direction and reflecting light fed from said light source and passed through any one of said color filters making up said color wheel while being put in said second inclination state in a second direction being different from said first direction;
   a driving unit to control so as to put each of said mirror elements in said digital mirror device panel in said first inclination state or said second inclination state according to a corresponding video signal and a revolution state of said color wheel;
   a photoelectric conversion device being placed as a photosensor in such a position where light reflected from at least one of said mirror elements is incident when said at least one of said mirror elements is in said second inclination state and, whereby said photoelectric conversion device receives said reflected light and converts the received light to a voltage;
   a correcting unit to receive a video signal and said voltage obtained by said photoelectric conversion device, to correct said video signal, based on the received voltage and to output the corrected video signal to said driving unit.

2. The digital mirror device projector according to claim 1, wherein said color wheel is configured by combining a red color filter, a green color and a blue color filter for making image light of said plurality of colors.

3. The digital mirror device projector according to claim 1, wherein said driving unit controls so as to put said at least one of said mirror elements in said digital mirror device panel in said first inclination state or said second inclination state according to said corrected video signal and a revolution state of said color wheel.

4. The digital mirror device projector according to claim 1, wherein said correcting unit calculates a relative intensity of light of color having passed through each of said color filters making up said color wheel, based on said voltage output from said photoelectric conversion device occurring when said at least one of said mirror elements of said digital mirror device panel is put in said second state, determines a weighted value to said light of color having passed through each of said color filters so that said relative intensity of said light of color is matched to a predetermined reference value, corrects a luminance signal for each color of a video signal using said weighted value and outputs the corrected luminance signal to said driving unit.

5. A digital mirror device projector comprising:
   a light source;
   a color wheel configured by combining a plurality of kinds of color filters for making image light of a plurality of colors;
   a digital mirror device panel having a plurality of mirror elements each being controlled so as to be put in a first inclination state and in a second inclination state and reflecting light fed from said light source and passed through any one of said color filters making up said color wheel while being put in said first inclination state, as said image light, in a first direction and reflecting light fed from said light source and passed through any one of said color filters making up said color wheel while being put in said second inclination state in a second direction being different from said first direction;
   a driving unit to control so as to put each of said mirror elements in said digital mirror device panel in said first inclination state or said second inclination state according to a corresponding video signal and a revolution state of said color wheel;
   a photoelectric conversion device being placed as a photosensor in such a position where light reflected from each of said mirror elements is incident when each of said mirror elements is in said second inclination state and, whereby said photoelectric conversion device receives said reflected light and converts the received light to a voltage;
   a correcting unit to receive a video signal and said voltage obtained by said photoelectric conversion device, to correct said video signal, based on the received voltage and to output the corrected video signal to said driving unit.

6. The digital mirror device projector according to claim 5, wherein said color wheel is configured by combining a red color filter, a green color and a blue color filter for making image light of said plurality of colors.

7. The digital mirror device projector according to claim 5, wherein said driving unit controls so as to put each of said mirror elements in said digital mirror device panel in said first inclination state or said second inclination state according to said corrected video signal and a revolution state of said color wheel.

8. The digital mirror device projector according to claim 5, wherein said correcting unit calculates a relative intensity of light of color having passed through each of said color filters making up said color wheel, based on said voltage output from said photoelectric conversion device occurring when each of said mirror elements of said digital mirror device panel is put in said second state, determines a weighted value to said light of color having passed through each of said color filters so that said relative intensity of said light of color is matched to a predetermined reference value, corrects a luminance signal for each color of a video signal using said weighted value and outputs the corrected luminance signal to said driving unit.

9. A method for correcting a video signal to be used in a digital mirror device projector made up of a light source, a color wheel configured by combining a plurality of kinds of color filters for making image light of a plurality of colors, a digital mirror device panel having a plurality of mirror elements each being controlled so as to be put in a first inclination state and in a second inclination state and reflecting light fed from said light source and passed through any one of said color filters making up said color wheel while being put in said first inclination state, as said image light, in a first direction and reflecting light fed from said light source and passed through any one of said color filters making up said color wheel while being put in said second inclination state in a second direction being different from said first direction, and a driving unit to control so as to put each of said mirror elements in said digital mirror device panel in said first inclination state or said second inclination state, said method comprising:
   a step of placing a photoelectric conversion device as a photo-sensor in such a position where light reflected from at least one of said mirror elements is incident when said at least one of said mirror elements is in said second inclination state and, whereby said photoelectric conversion device receives said reflected light and converts the received light to a voltage;
   a step of having a correcting unit receive a video signal and said voltage obtained by said photoelectric conversion device, correct said video signal, based on the received voltage and output the corrected video signal to said driving unit; and
   a step of having said driving unit control so as to put said at least one of said mirror elements in said digital mirror device panel in said first inclination state or said second inclination state according to said corrected video signal and a revolution state of said color wheel.

10. The method for correcting the video signal according to claim 9, wherein said color wheel is configured by combining a red color filter, a green color and a blue color filter for making image light of said plurality of colors.

11. The method for correcting the video signal according to claim 9, wherein said correcting unit calculates a relative intensity of light of color having passed through each of said color filters making up said color wheel, based on the output voltage from said photoelectric conversion device occurring when said at least one of said mirror elements of said digital mirror device panel is put in said second state, determines a weighted value to said light of color having passed through each of said color filters so that said relative intensity of said light of color is matched to a predetermined reference value, corrects a luminance signal for each color of a video signal using said weighted value and outputs the corrected luminance signal to said driving unit.

12. A method for correcting a video signal to be used in a digital mirror device projector made up of a light source, a color wheel configured by combining a plurality of kinds of color filters for making image light of a plurality of colors, a digital mirror device panel having a plurality of mirror elements each being controlled so as to be put in a first inclination state and in a second inclination state and reflecting light fed from said light source and passed through any one of said color filters making up said color wheel while being put in said first inclination state, as said image light, in a first direction and reflecting light fed from said light source and passed through any one of said color filters making up said color wheel while being put in said second inclination state in a second direction being different from said first direction, and a driving unit to control so as to put each of said mirror elements in said digital mirror device panel in said first inclination state or said second inclination state, said method comprising:

a step of placing a photoelectric conversion device as a photo-sensor in such a position where light reflected from each of said mirror elements is incident when each of said mirror elements is in said second inclination state and, whereby said photoelectric conversion device receives said reflected light and converts the received light to a voltage;

a step of having a correcting unit receive a video signal and said voltage obtained by said photoelectric conversion device, correct said video signal, based on the received voltage and output the corrected video signal to said driving unit; and a step of having said driving unit control so as to put each of said mirror elements in said digital mirror device panel in said first inclination state or said second inclination state according to said corrected video signal and a revolution state of said color wheel.

13. The method for correcting the video signal according to claim 12, wherein said color wheel is configured by combining a red color filter, a green color and a blue color filter for making image light of said plurality of colors.

14. The method for correcting the video signal according to claim 12, wherein said correcting unit calculates a relative intensity of light of color having passed through each of said color filters making up said color wheel, based on the output voltage from said photoelectric conversion device occurring when each of said mirror elements of said digital mirror device panel is put in said second state, determines a weighted value to said light of color having passed through each of said color filters so that said relative intensity of said light of color is matched to a predetermined reference value, corrects a luminance signal for each color of a video signal using said weighted value and outputs the corrected luminance signal to said driving unit.

* * * * *